Figure 2A:
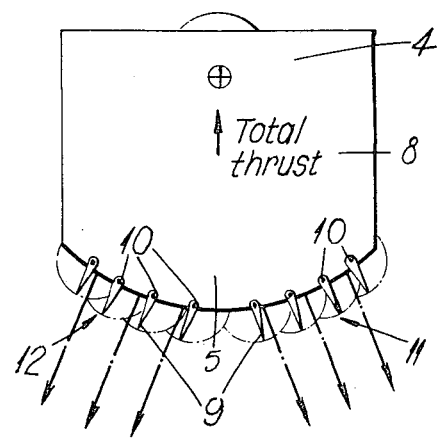

United States Patent [19]

Bradbury

[11] 3,912,201
[45] Oct. 14, 1975

[54] AIRCRAFT

[75] Inventor: Charles Bradbury, Hatfield, England

[73] Assignee: Hawker Siddeley Aviation Limited, England

[22] Filed: Sept. 13, 1972

[21] Appl. No.: 288,728

[52] U.S. Cl............. 244/23 D; 60/230; 239/265.25; 244/12 D; 244/52
[51] Int. Cl.²......................................... B64C 15/06
[58] Field of Search.... 244/12 R, 12 D, 12 C, 23 R, 244/23 D, 23 C, 52, 53 R, 12 B; 60/226 R, 226 A, 229, 230; 239/265.25, 265.29

[56] References Cited
UNITED STATES PATENTS

| | | | |
|---|---|---|---|
| 2,968,453 | 1/1961 | Bright | 244/12 D |
| 3,140,841 | 7/1964 | Marchant et al. | 244/23 D |
| 3,161,374 | 12/1964 | Allred et al. | 244/12 B |
| 3,206,929 | 9/1965 | Marchant et al. | 60/229 X |
| 3,545,209 | 12/1970 | Millward | 60/226 |
| 3,545,210 | 12/1970 | Cresswell | 244/12 B |
| 3,577,736 | 5/1971 | Stevens | 60/226 R |
| 3,703,266 | 11/1972 | Lincks et al. | 244/52 |

*Primary Examiner*—M. Henson Wood, Jr.
*Assistant Examiner*—Randolph A. Reese
*Attorney, Agent, or Firm*—Rose & Edell

[57] ABSTRACT

Power plant for a VSTOL or VTOL aircraft consists of a jet lift unit, such as a fan lift engine, having its exhaust trunk bifurcated to form forward and rear ducts which are in turn divided laterally to form a pair of efflux nozzles on each duct, four nozzles in all. Each of the nozzles has efflux-deflecting means in the form of a set of louvres, the four sets of louvres being differentially operated to give roll, pitch and yaw while maintaining the total vertical lift component constant.

6 Claims, 5 Drawing Figures

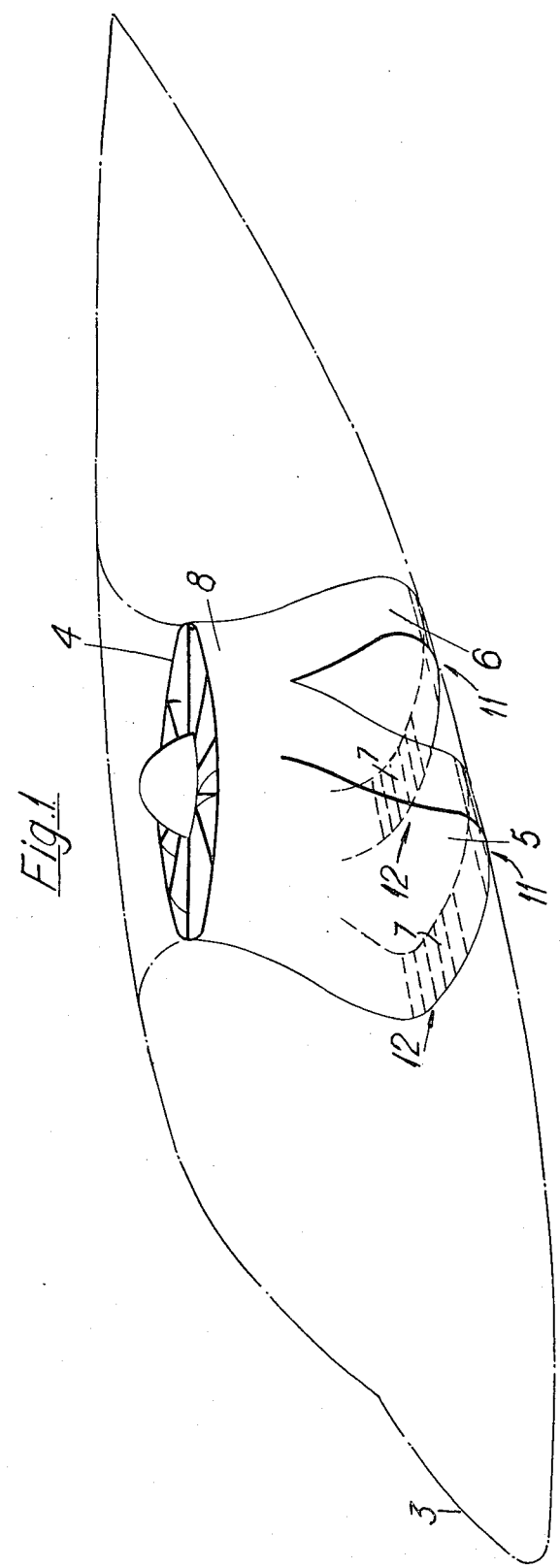

AIRCRAFT

This invention relates to VSTOL or VTOL aircraft and especially aircraft of this type having a single power unit to provide lifting thrust, for example, a fan lift engine.

It is desirable with such aircraft that the lift engine shall not only provide a lifting force, but can be used for the purpose of attitude control, particularly during the vertical and low forward speed flight modes when normal aerodynamic control surfaces are ineffective. Attitude control about all axes may be achieved by suitable deflection of the lift unit efflux.

According to the present invention, the efflux from a single unit providing lifting thrust is directed through bifurcated ducting to a plurality of, e.g. four, thrust-deflecting outlets. Pivoted louvres may be arranged in these outlets to form thrust nozzles which can be employed for combined vertical lift and attitude control. In wing-borne flight, when the lift unit is not in use, the louvres can be rotated about their pivots to close the nozzles and provide an uninterrupted fuselage surface.

One arrangement in accordance with the invention will now be described by way of example with reference to the accompanying drawings, in which:

FIG. 1 shows, in diagrammatic pictorial view, an aircraft fuselage in outline containing a lift fan installation according to the invention, and FIGS. 2a, 2b, 2c and 2d are diagrammatic representations of the fan unit installation, in front elevation, each representing a particular attitude control situation.

Referring to the drawings, FIG. 1 shows a fuselage 3 in outline within which is located a lift fan unit 4 with the fan axis disposed vertically. The fuselage 3 shown only in broken outline is that of an otherwise conventional aircraft with a propulsion engine orientated fore and aft in the usual manner; more particularly, the aircraft may have a configuration substantially similar to that shown in U.S. Pat. application Ser. No. D-201,256, now U.S. Pat. No. D-230,350, filed Nov. 22, 1971, and assigned to the same assignee as the present invention. The drive means for the lift fan unit is likewise conventional; and, in particular, it can take the form of a tip turbine such as disclosed in U.S. Pat. No. 3,310,260. The exhaust trunk 8 leading downward from the fan unit is bifurcated to form forward and rear ducts 5 and 6, and the fan efflux is divided between these ducts and is discharged through louvred outlets 7 designed to produce a constant total nozzle area and a substantially constant total vertical trust component in all control positions.

Two groups of louvre blades 9 are situated to port and starboard respectively, in each outlet 7, to provide four thrust deflecting nozzles 11, 12. The blades 9 in each individual group have pivots 10 and can be turned angularly in unison to give a wide range of deflected thrust angles and directions. The means for controlling such louvre blades is conventional and may, for example, take the form of pivotally connected links that can be operated by conventional control rods much as disclosed in U.S. Pat. No. 3,206,929.

Figure 2B:
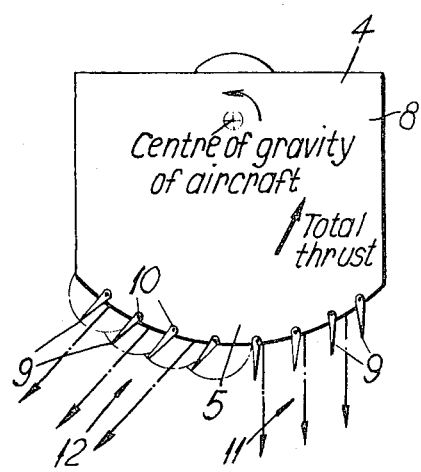
Figure 2C:
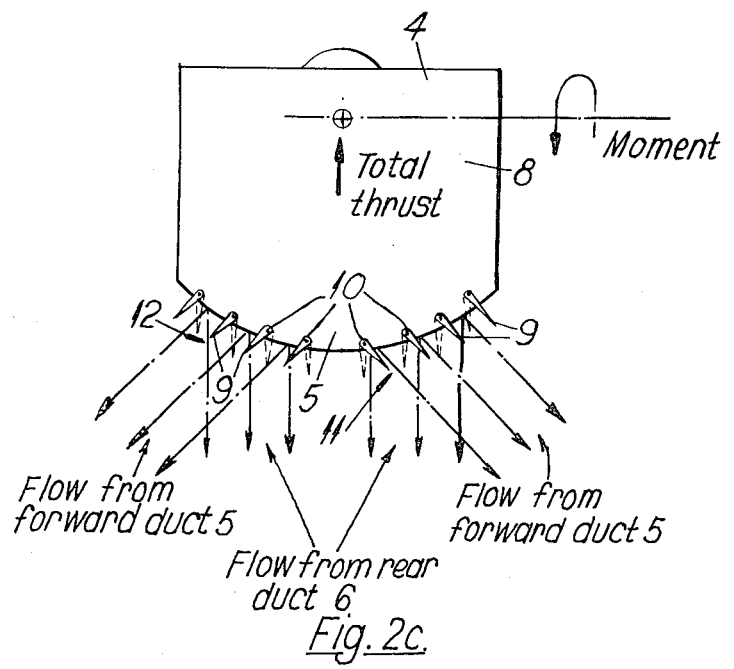

FIG. 2a indicates the vertical flight mode under steady conditions with the two groups of louvres in each duct occupying angular positions that are symmetrical about the aircraft vertical centre plane giving a vertical thrust force. Common movement of all the louvres in the same direction provides a rolling moment about the aircraft centre of gravity. FIG. 2b indicates, for example, a rolling maneouvre to starboard produced by a common movement of all louvres brought about by a lateral displacement of the pilot's control column. Pitch control is achieved by a variation in the vertical lift component between the forward and rear ducts 5 and 6. FIG. 2c illustrates a nose down pitching moment, where the total rear duct flow is directed vertically downwards, producing an increase in the vertical thrust component, whereas outward deflection of the two forward groups of louvres produces a reduction in the vertical thrust component, this being brought about by a forward displacement of the control column.

Yawing moments are produced by movement in opposite directions of the front and the rear groups of nozzle louvres through operation of the pilot's rudder pedals. This is indicated in FIG. 2d which illustrates a yawing moment resulting in a turning manoeuvre to port.

Figure 2D:
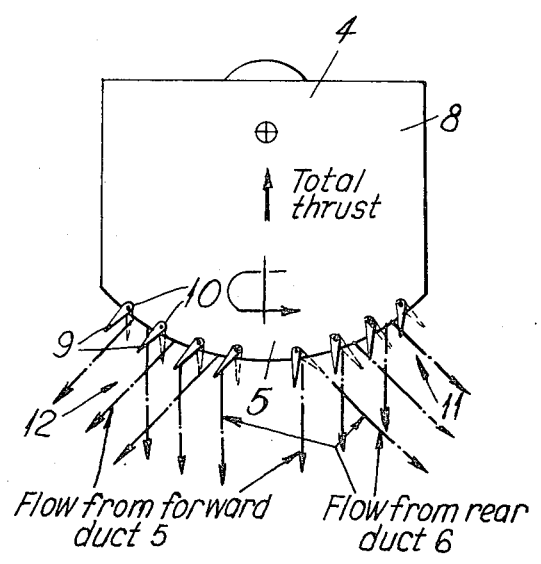

It will readily be understood from consideration of FIGS. 2a and 2d that by appropriately linking the movements of the four nozzle groups, so that increase in the vertical component of lift at one nozzle is cancelled out be a corresponding reduction of the lift component at another nozzle, the total vertical lift may be kept constant during all types of maneuver.

What I claim is:

1. A lifting power plant for a V/STOL aircraft, comprising a single jet lift unit having forward and rear downwardly-directed efflux discharge ducts and a downwardly-directed exhaust trunk which is bifurcated to connect with said discharge ducts, each said duct having two generally downwardly-directed nozzles disposed laterally side by side, said nozzles being symmetrically disposed about a vertical axis extending through the center of gravity of said aircraft, and each said nozzle being equipped with efflux-direction-controlling means selectively operable to deflect the efflux from its respective nozzle only in a plane substantially at right angles to the fore and aft axis of the aircraft.

2. Power plant according to claim 1, wherein each nozzle is equipped with a set of thrust-deflecting louvres turning about fore and aft pivot axes.

3. Power plant according to claim 1, wherein said efflux-direction-controlling means are operable in a first mode in which all four effluxes are deflected laterally in unison, a second mode in which the forward pair of effluxes are deflected in unison in one direction and the rear pair in unison in the opposite direction, and a third mode in which the forward effluxes are deflected in opposite directions and the rear effluxes likewise in opposite directions but oppositely to the forward effluxes.

4. Power plant according to claim 3, wherein the efflux-direction-controlling means are arranged to deflect all the effluxes by substantially equivalent amounts, whatever the mode of operation, to preserve a substantially constant total lift component.

5. In a V/STOL aircraft, a lifting power plant comprising a jet lift unit, fixed multi-branched efflux discharge ducting therefor, a forward pair of generally downwardly-directed nozzles and a rearward pair of generally downwardly-directed nozzles, the nozzles in each pair being laterally spaced so that all four nozzles lie substantially at the corners of a rectangle whose center is coincident with a vertical axis which passes through the center of gravity of said aircraft, said multi-branched discharge ducting connecting said two pairs of nozzles to said jet lift unit and distributing the efflux of said jet lift unit equally to all four nozzles, each said nozzle being equipped with efflux-direction-controlling means selectively operable to deflect the efflux from its respective nozzle only in a plane substantially at right angles to the fore and aft axis of the aircraft.

6. In a V/STOL aircraft, a lifting power plant comprising a jet lift unit mounted with its axis substantially vertical, multi-branched efflux discharge ducting at the lower end of said jet lift unit, four nozzles below said jet lift unit and lying substantially at the four corners of a rectangle two sides of which rectangle are parallel to the fore and aft axis of the aircraft, said multi-branched discharge ducting connecting said four nozzles to said jet lift unit and distributing the efflux of said jet lift unit to all four nozzles, each said nozzle being equipped with efflux-direction-controlling means selectively operable to deflect the efflux from its respective nozzle only in a plane substantially at right angles to the fore and aft axis of the aircraft.

* * * * *